(12) United States Patent
Do et al.

(10) Patent No.: US 11,614,823 B2
(45) Date of Patent: Mar. 28, 2023

(54) MACRO-MINI ACTUATION OF PNEUMATIC POUCHES FOR SOFT WEARABLE HAPTIC DISPLAYS WITH INDEPENDENT CONTROL OF FORCE AND CONTACT AREA

(71) Applicant: The Board of Trustees of the Leland Stanford Junior University, Stanford, CA (US)

(72) Inventors: Brian H. Do, Plant City, FL (US); Allison M. Okamura, Mountain View, CA (US); Laura H. Blumenschein, Lafayette, IN (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 17/718,043

(22) Filed: Apr. 11, 2022

(65) Prior Publication Data

US 2022/0326803 A1 Oct. 13, 2022

Related U.S. Application Data

(60) Provisional application No. 63/173,843, filed on Apr. 12, 2021.

(51) Int. Cl.
*G06F 3/041* (2006.01)
*G08B 6/00* (2006.01)
*G06F 3/01* (2006.01)

(52) U.S. Cl.
CPC .......... *G06F 3/0416* (2013.01); *G06F 3/016* (2013.01); *G08B 6/00* (2013.01)

(58) Field of Classification Search
None
See application file for complete search history.

(56) References Cited

U.S. PATENT DOCUMENTS

2021/0145450 A1* 5/2021 Gruentzig ............ A61B 5/6806
2021/0316446 A1* 10/2021 Leroy .................... G06F 3/014

OTHER PUBLICATIONS

Niiyama—Kim—Pouch Motors—Printable Soft Actuators Integrated with Computational Design—Soft Robotics 2015(2), pp. 59-70.
Greer et al. Series Pneumatic Artificial Muscles (sPAMs) and Application to a Soft Continuum Robot. 2017 IEEE Int. Conf. Robotics and Automation ICRA.pp. 5503-5510.

* cited by examiner

*Primary Examiner* — Stephen T. Reed
(74) *Attorney, Agent, or Firm* — Lumen Patent Firm

(57) ABSTRACT

A macro-mini actuation mechanism for pneumatic pouches is provided which involves stacking smaller proximal pouches (proximal layer) underneath larger distal pouches (distal layer). The proximal layer of smaller pouches is the contact area with e.g. a (human) body. Macro-mini pneumatic actuation of pouches for wearable haptic displays allows for the control of contact area of pneumatic pouches and the ability to cover large areas while maintaining a fast-dynamic response and higher spatial resolutions. This stacked pouch concept allows for pressure/force feedback to a user—something which cannot be rendered by vibrotactile actuators alone. Control of effective pouch height may also allow a potential wearable haptic display to better conform to the human body. A pressure-based display with stacked pouches could allow for larger tolerances between the display and the human body without sacrificing contact area, allowing better fit across users.

7 Claims, 9 Drawing Sheets

FIG. 7A
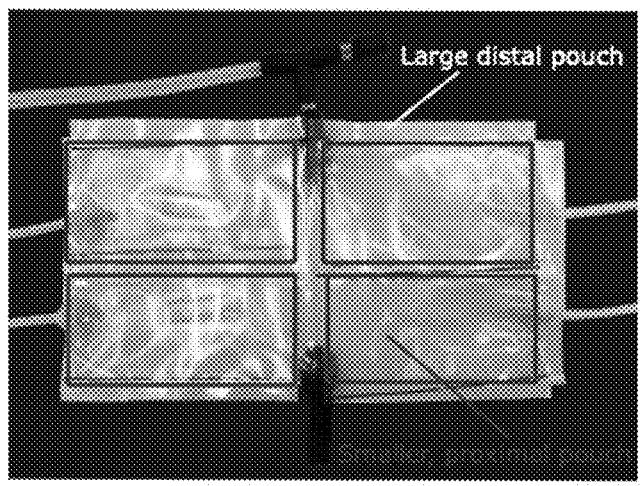
FIG. 7B
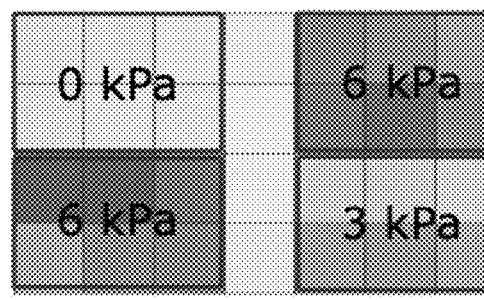
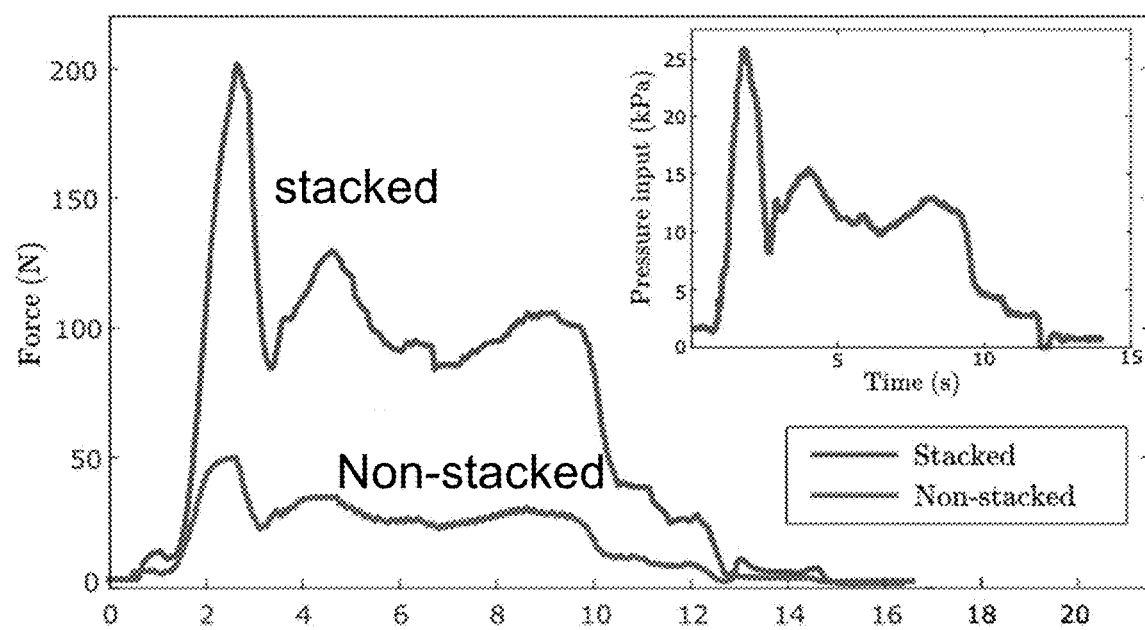
FIG. 7C

MACRO-MINI ACTUATION OF PNEUMATIC POUCHES FOR SOFT WEARABLE HAPTIC DISPLAYS WITH INDEPENDENT CONTROL OF FORCE AND CONTACT AREA

CROSS-REFERENCE TO RELATED APPLICATIONS

This application claims priority from US Provisional Patent Application 63/173843 filed Apr. 12, 2021, which is incorporated herein by reference.

STATEMENT OF GOVERNMENT SPONSORED SUPPORT

This invention was made with Government support under contract 1830163 awarded by the National Science Foundation. The Government has certain rights in the invention.

FIELD OF THE INVENTION

This invention relates to actuators for haptic displays with independent control of force and contact area.

BACKGROUND OF THE INVENTION

Haptics involves a wide range of rich sensations, such as vibration and pressure. While vibrations can be readily replicated using technologies like coin motors of voice coils, large, distributed pressure feedback is more challenging to provide, particularly in a wearable device. However, pressure is intrinsic to many forms of social touch, such as hugging.

Existing wearable haptic displays use pneumatic pouches due to their light weight and ability to exert pressure against the skin. These devices embed pouches into jackets, vests, and other form factors and for closed-loop control, often rely on force feedback. However, force is the product of contact area and pressure, and single pouches alone cannot vary their contact area independent from their pressure. Thus, when replicating social touches or other desired forces, there is the possibility of rendering pressures which do not match the desired force distributions, since a low pressure and large contact area can produce the same force as a high pressure with a small contact area, but will yield different responses. The inability to control contact area thus limits what types of haptics can be rendered.

Furthermore, with any wearable device, there are competing demands between ensuring a very tight fit so that pouches make good contact with the skin, and having a loose fit to allow the user to retain freedom of movement and comfort. Because existing devices cannot actively vary their contact area, but typically desire high contact areas, this means existing haptic displays are usually designed with straps to constrain them against the user very tightly.

Finally, there is a tradeoff between pneumatic pouch size and response time. The larger a pouch, the slower its dynamic response. Wearable haptic displays aim to cover large areas of the body while maintaining a fast response.

SUMMARY OF THE INVENTION

The present invention provides a macro-mini actuation for pneumatic pouches which involves stacking smaller proximal pouches (proximal layer) underneath larger distal pouches (distal layer). The general concept is shown in FIG. 1. The size dimension of small and large is defined where smaller proximal pouches is defined relatively smaller than the larger distal pouches. The proximal layer of smaller pouches is the contact area with e.g. a (human) body. Contact can be made directly or through a layer of material that is in between the proximal layer and the contact area. An inextensible constraining layer could be placed above the distal pouch(es) to constrain the overall inflation height, preventing free expansion of the pouch stack and resulting in pressure being applied to the contact surface.

The contact area that a proximal pouch has with a surface depends directly on its effective height. Meanwhile, the applied pressure depends directly on its internal pressure. The detailed description provides further details and analyses of the working of the macro-mini actuation for pneumatic stacked pouches.

The total applied force from a pouch is the product of its contact area, which is a function of pouch height, and its internal pressure. In a typical single layer pouch setup, only the internal pressure can be controlled. By stacking pouches on top of each other, the effective heights of the pouches can be set by independently controlling the internal pressures of the distal and proximal pouches. This height is a function of the relative ratio of the distal and proximal pouch pressures. Pouch stacking thus allows for independent control of pouch force and contact area. For a desired proximal pouch pressure, a corresponding distal pouch pressure can be set to obtain the required proximal pouch height to obtain the desired proximal pouch force.

The number of smaller proximal pouches in the proximal layer is one or more or two or more. The number of larger distal pouches in the distal layer is one or more as long as the number of smaller proximal pouches is larger than or equal to the number of larger distal pouches.

In each layer, the pouches in that layer could be of similar size/dimension or could be of different size/dimension as long as the basic concept remains as described above.

In one variation the macro-mini actuation structure is not limited to a proximal and a distal layer as one could apply further dimensional control of actuation by adding additional layers basically providing more sensitivity to the sensation of touch and/or haptic display. A skilled artisan would appreciate such variations like the ones of changing the number of pouches in each layer as they could be application specific/dependent.

In another variation, the macro-mini pouch actuation strategy can be implemented for working fluids besides air. In general, pouches can be controlled both pneumatically and hydraulically.

In one embodiment, the invention is a method of independently controlling force and contact area of an actuator for a haptic display to elicit a touch sensation. For this method one would have a first layer of one or more distal pouches. Each of the distal pouches has a flexible surface and a volume with a pressure. One would also have a second layer of one or more proximal pouches. Each of the proximal pouches has a flexible surface and a volume with a pressure. The second layer is stacked over the first layer, and the second layer is either directly or indirectly in contact with an object or a person. The pressure of the volume of the one or more distal pouches in the first layer is controlled, and the pressure of the volume of the one or more proximal pouches in the second layer is controlled. Key to the invention and embodiments is that the pressure in the first layer is independently controlled from the pressure in the second layer resulting in an independent control of an amount of force and a contact area at the surface of the second layer, which is either directly or indirectly in contact with the object or the person.

Examples of variations and/or other embodiments are:
the second layer has two or more proximal pouches,
the number of proximal pouches in the second layer is larger than the number of distal pouches in the first layer,
the proximal pouches are smaller or equal in volume compared to the distal pouches,
the number of distal pouches in the first layer is two or more and the pressure for each of the distal pouches is independently controlled from each other,
the number of proximal pouches in the second layer is two or more and the pressure for each of the proximal pouches is independently controlled from each other, and/or (if applicable)
the pressure in the distal and proximal pouches is controlled pneumatically or hydraulically.

In another embodiment, the invention is an actuator for a haptic display to elicit a touch sensation having independent controllers to control pressure of distal and proximal pouches stacked together resulting in the independent control of force and contact area of the actuator.

Applications

Macro-mini pneumatic actuation of pouches for wearable haptic displays could be used for a variety of purposes including: 1) remote social touch, 2) augmented/virtual reality experiences, 3) teleoperation of robots, and 4) motion guidance. To elaborate further on each:

1) Remote social touch: This could be used to render social interactions such as hugging or patting between otherwise physically-separated users. Within the context of social communication, this provides another layer of interaction beyond audiovisual feedback. Potential users could include partners or family members who are separated and can only communicate remotely. Some possible examples could be a parent on a business trip who wants to physically comfort their child, or an adult who has elderly parents in nursing care who they can't visit in-person due to e.g. COVID restrictions, but who they want to hug.

2) Augmented/virtual reality experiences: Currently, VR is mainly an audiovisual experience. Increasing the level of immersion, particularly through haptics, is an area of active research in the field. Existing devices focus on either providing haptic feedback to the hands—but that necessarily excludes the rest of the body—or vibrotactile feedback to the body—which cannot replicate force/pressure on the body. Users here include gamers, movie watchers, and field workers.

3) Teleoperation of robots and 4) Motion guidance: The benefits for these two areas are similar to those outlined for 1 and 2. To be more specific, many robots are non-anthropomorphic, which can make it more difficult for a user to intuitively understand the state a robot is in. Currently, users mostly rely on audiovisual cues to get feedback from a robot. With regards to motion guidance, the goal is to provide directional cues in an unobtrusive form factor.

Macro-mini pneumatic actuation of pouches for wearable haptic displays allows for the control of contact area of pneumatic pouches and the ability to cover large areas while maintaining a fast-dynamic response and higher spatial resolutions.

This stacked pouch concept allows for pressure/force feedback to a user—something which cannot be rendered by vibrotactile actuators alone.

Compared to a single layer of small pouches, the macro-mini approach of stacking pouches of this invention enables the control of contact area within a larger range, and specifically allows a higher maximum contact area than would occur with a single pouch for a given height constraint. The latter is particularly notable since small pouches alone inherently have a limited inflation height while larger pouches limit the system dynamics. Compared to a single large pouch, the approach of this invention enables finer resolution of localized forces to be displayed and quicker dynamic response. Both of these allow a larger range of haptic sensations to be rendered. Furthermore, by controlling the effective height in a stacked pouch configuration, the spatial pressure distribution could be dynamically varied with time.

Control of effective pouch height may also allow a potential wearable haptic display to better conform to the human body. A pressure-based display with stacked pouches could allow for larger tolerances between the display and the human body without sacrificing contact area, allowing better fit across users.

BRIEF DESCRIPTION OF THE DRAWINGS

In FIG. 4B, pressure distributions for Pp=20 kPa. While the total contact area increases with increasing Pd, the pressure exerted in the middle remains 20 kPa. In FIG. 4C, contact area distributions show that increasing Pd and Pp by the same relative amount increases the applied pressure while keeping contact area constant. For color interpretation the reader is referred to Appendix A of the priority document.

FIGS. 7A-C show according to an exemplary embodiment of the invention in FIG. 7A a pouch array can be constructed by stacking a number of smaller proximal pouches outlined in 'red' beneath one larger distal pouch (for color interpretation the reader is referred to Appendix A of the priority document). In FIG. 7B, this can yield distinct, complex pressure patterns. In FIG. 7C, depending on whether a stacked or non-stacked configuration is used, the same pressure input signal (obtained from experiments with a huggable robot and shown as an inset in the top right) results in different levels of total applied force. For color interpretation the reader is referred to Appendix A of the priority document.

DETAILED DESCRIPTION

Setup and Experimental Methods

In general, pouches can be fabricated from any thin, flexible, inextensible, air-tight material. Here in an exemplary embodiment, pouches were created by heat sealing low-density polyethylene (LDPE) plastic tubes due to ease of fabrication. To allow airflow into pouches, nylon through-wall connectors were embedded into the pouch walls. One side was connected to a pressure source, and the opposite side was connected to a pressure sensor (NXP MPX5100DP). Closed-loop pressure control was achieved using proportion air QB3 regulators. For tests investigating the pouch dynamic response to a step pressure input, air was supplied from a large pressure chamber to provide near constant pressure after opening a valve in order to avoid including the pressure regulator internal dynamics.

Figure 1:
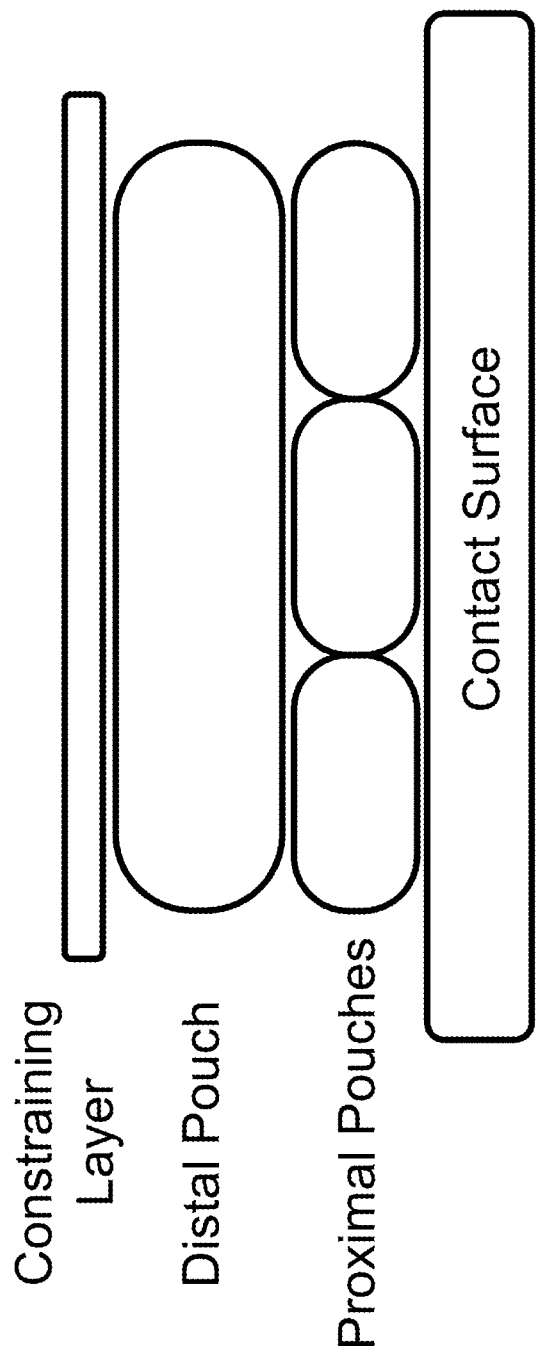
FIG. 1 shows a general concept of the device and method according to an exemplary embodiment of the invention.

Two experimental setup variants were used to measure the dynamic and static characteristics of the pouches. In the first, pouches were placed on top of an acrylic plate mounted to an ATI mini45 force/torque sensor (see FIG. 1A in Appendix A of the priority document). This was used for the dynamic experiments. In the second, static spatial force distributions were recorded by placing pouches on a custom soft pressure sensing array (pressure profile systems) (see FIG. 1B in Appendix A of the priority document). The rectangular 580 cm² array is composed of 2.54 cm×2.54 cm capacitive sensors. For both test setups, a height constraint, h, was imposed on the pouch. A flat plate secured by weights was placed above the pouch at the desired height set by aluminum framing, which was added or removed to modify the height.

Force Distribution

Simplified Pouch Contact Area Model for Design

The total force exerted by a pneumatic pouch on its environment is the product of its contact area and its internal pressure. If the membrane elastic energy is negligible, even a small pressure difference relative to atmosphere will result in inflation to a final volume-maximizing shape that remains the same even as the internal pressure increases. Thus, to calculate the shape, and therefore the contact area, one only need to consider the geometry and not the pressure.

In general, calculating the shape created by inflating an inextensible membrane is a challenging problem. For rectangular pouches, this has been described as the "paper bag" problem. While inflated shapes in the unconstrained case can be described via calculus of variations by a set of three simultaneous partial differential equations, solving for that shape is considerably complex. Numerical techniques such as finite element modeling can also be used to solve for the shape but are computationally expensive.

Instead, here for exemplary purposes the inventors created a simplified pouch contact area model based on geometric constraints. The model assumes that the uninflated pouch has two flat rectangular faces (length L and width W) made of a flexible, inextensible membrane. Observing real pouches reveals that all sides of this initial rectangle exhibit some curvature in the final inflated pouch shape. The inventors made the simplification that the long sides of the pouch remain straight; that is, one would assume that the curvature is sufficiently low that one can treat these sides as straight to only consider the relatively higher curvature of the shorter sides. For modeling a square pouch, the inventors arbitrarily treated one set of sides as curving and the other set as straight. The model considers only the gross pouch shape. In reality, when inflated, the pouch surface exhibits a number of small wrinkles that warp the pouch surface. Finally, the model assumes that the pouch is sandwiched between two flat, rigid plates that are separated by a fixed height, h.

Figures 2A, 2B:
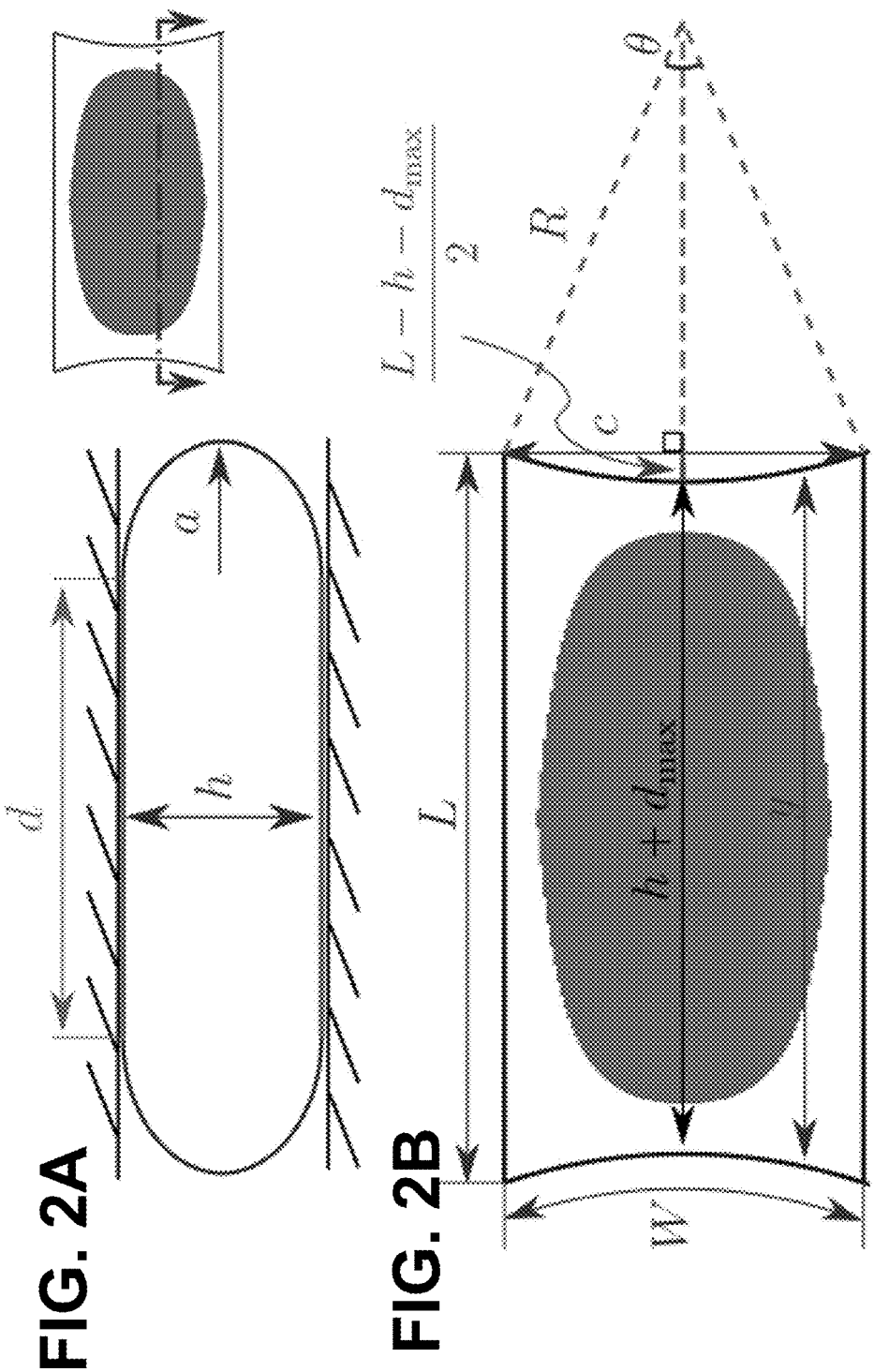
FIG. 2A shows according to an exemplary embodiment of the invention a side cross section of an inflated pouch.
FIG. 2B shows according to an exemplary embodiment of the invention a top-down schematic of a simplified height-constrained inflated pouch.

In general, the actual shape adopted by a pouch minimizes its potential energy, tending to increase volume and reduce membrane tension. To solve for the shape, the model examines lengthwise cross sections and solves for their dimensions using a set of geometric constraints. FIG. 2A shows such a cross section, having of a rectangle with elliptical arcs on two sides. The rectangle is defined by h and the length d that the pouch makes contact with the surface. The ellipses have a semi-major axis a and a fixed semi-minor axis b=h/2.

FIG. 2B shows a top-down pouch view. The inventors assumed that the curved sides form an arc with a constant radius of curvature and an arc length W. As we move towards the middle of W, the projected distance y between these arcs decreases, resulting in the contact length d increasing to satisfy the constraint of constant cross-section perimeter.

At the cross section defined by $y_{min}$ (and thus $d_{max}$), it was assumed that the arcs which form the sides of FIG. 2A) are circular arcs with radius r=h/2. Therefore, $y_{min}=d_{max}+h$, and the difference between L and each side wall at this point is $(L-h-d_{max})/2$. Also, since the sides are circular arcs, $\theta=W/R$. Plugging these values into the formula for chord height yields:

$$\frac{1}{2}(L - d_{max}) - r = R\left(1 - \cos\frac{W}{2R}\right) \quad (1)$$

Solving (1) for R then allows us to calculate the chord length $c=2R\sin\theta/2$.

This value then gives the pouch corner locations, which, along with R, specify the equations of the circles that define the side arcs seen from the top-down projected view of the pouch in FIG. 2B. The distance y between the left and right pouch sides can be calculated by taking the difference between the two circle equations.

To solve for d for the rest of the pouch, we use constraints on the projected distance y and cross section perimeter 2L:

$$y = d + 2a \quad (2)$$

$$2L = 2d + \pi\left[3\left(\frac{h}{2} + a\right) - \sqrt{\left(3\frac{h}{2} + a\right)\left(\frac{h}{2} + 3a\right)}\right] \quad (3)$$

Equation (3) is the sum of the flat wall portions and the ellipse formed by the sides. Simultaneously solving (2) and (3) yields d and a for all points where the pouch height is h. By discretizing the pouch length, solving the above set of equations at each point, and then numerically integrating all calculated d, the contact area and shape can be calculated.

Single Pouch Results

Figure 3:
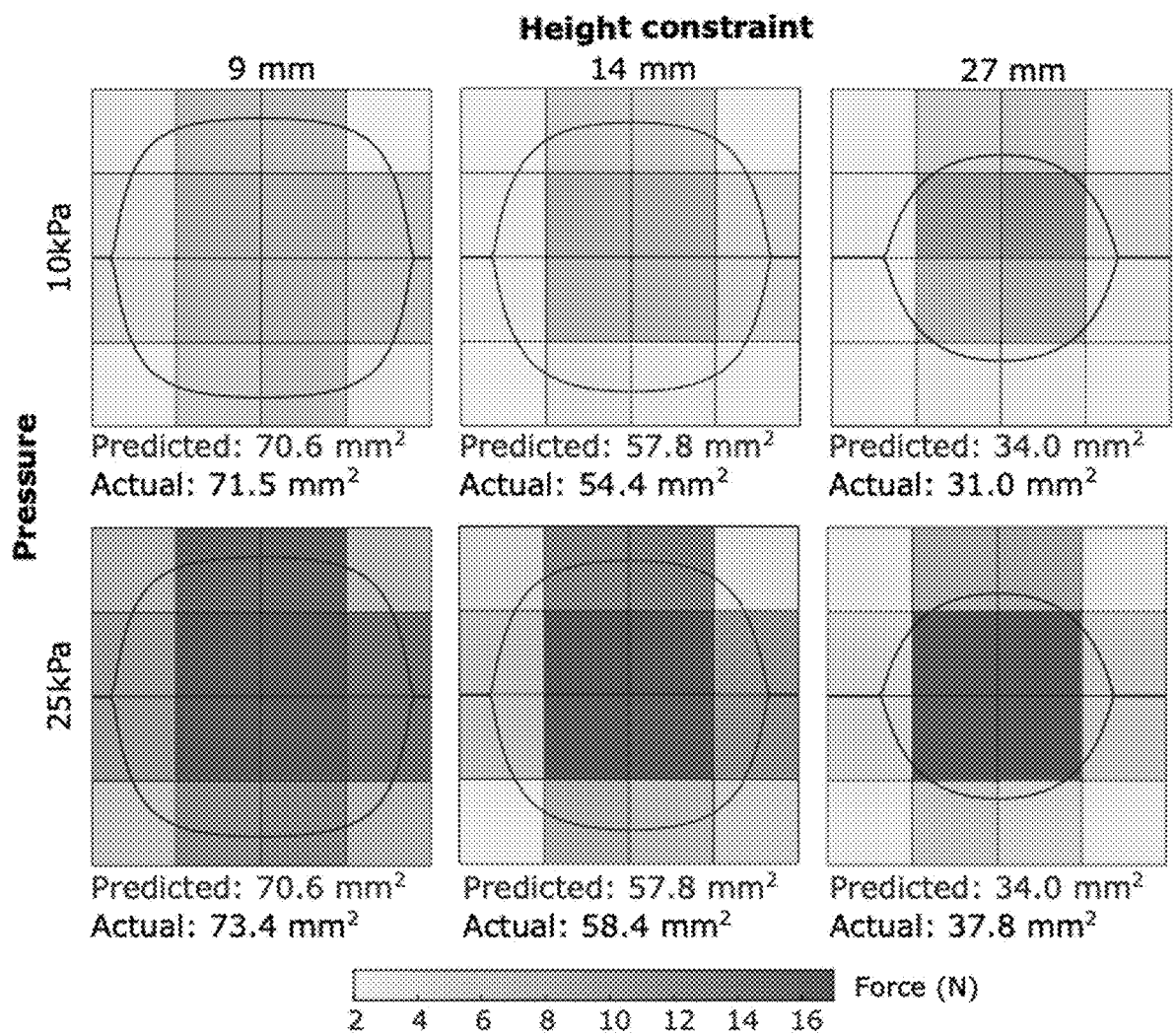
FIG. 3 shows according to an exemplary embodiment of the invention a spatial force distribution for varied height constraints and pressures for 10.5 cm×10.5 cm pouches. The predicted and actual contact area is listed beneath each distribution with the predicted shape outlined in 'red' (for color interpretation the reader is referred to Appendix A of the priority document). Contact area remains roughly constant with pressure while varying with the height constraint.

To investigate the contact model, the inventors conducted experiments using the pressure sensing array to measure the spatial force distribution. Combinations were tested of three different pouch geometries and eight height constraints, with internal pouch pressures ranging from 3.4 kPa to 25 kPa. This pressure range corresponded to the minimum output pressure of our controller and just below the pouch burst pressure. FIG. 3 visualizes a selection of recorded forces. This spatial force distribution data was used to obtain the contact area of the pouch for that given condition by dividing the total force recorded by the array by the known internal pouch pressure.

FIG. 3 shows an overlay of the predicted contact area and the numerical value. Three key trends were observed. First, for a pouch of a given geometry, its contact area depends only on the height constraint and not on the internal pouch pressure; across all trials, we found that contact area differed by less than 5.5% across tested pressures. If pouch dimensions and the height constraint are scaled at the same rate, the proportion of the pouch surface in contact remains constant. Second, the applied pressure exerted by a pouch (and thus, the force over any given area) depends directly on its internal pressure. Third, as the height h decreases, the contact area increases.

The error associated with our simplified contact area model increases with aspect ratio (L/W). This is due to only using the lengthwise cross sections of the pouches when solving for a contact area. In reality, the final pouch shape must also satisfy the isoperimetric constraints governing W. Because scaling pouch geometry and the height constraint results in a linear scaling of contact area, we can non-dimensionalize each using aspect ratio, $h^*=h/h_{max}$, and percent contact area=contact area/(LW), respectively, and use this to calculate the mean absolute percent error (MAPE). From empirical testing, we found that the MAPE from actual contact area measurements for 1:1 aspect ratios was 6.1% for eight tested heights $h^*=[0,1]$. From testing higher aspect ratios, we found that the height above which the model diverges by more than 10% from measured contact area decreases as the aspect ratio increases. This is due to W becoming the key constraint as the aspect ratio increases and the pouch shape approaches a tube.

Stacked Pouches Results

Figure 4A:
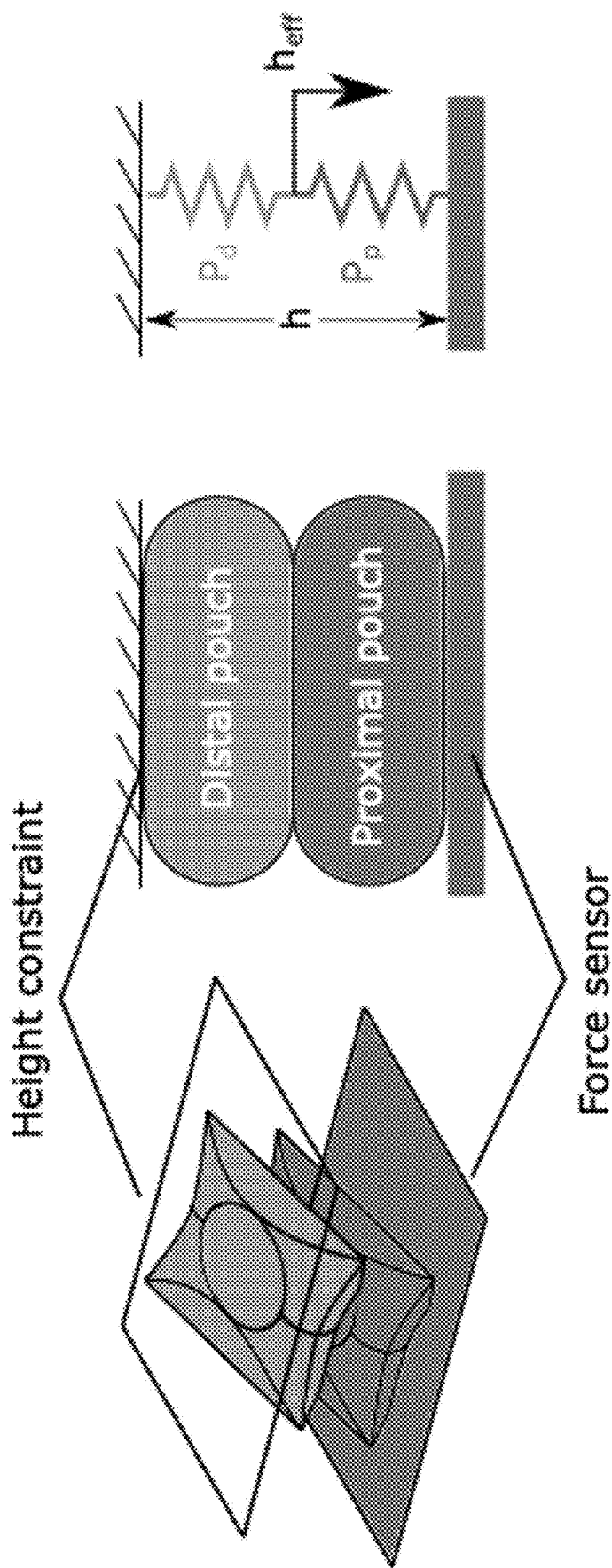
FIGS. 4A-C show according to an exemplary embodiment of the invention in FIG. 4A, schematic views of a sample pouch stacking setup with two pouches. Each pouch can be thought of as a nonlinear spring, and the relative ratios of the two determine the effective height.

Stacking pouches gives an extra degree of freedom for controlling the total output force by allowing for the contact area to be changed. FIG. 4A shows a schematic of the pouch stacking experimental setup using two pouches—one which is proximal to the desired contact surface and the other which is distal to it—stacked on top of each other.

In this arrangement, each pouch can be thought of as a nonlinear spring whose force depends on its internal pouch pressure. The relative ratio of these pressures determines the effective height, heff, experienced by the proximal pouch.

Figure 4B:
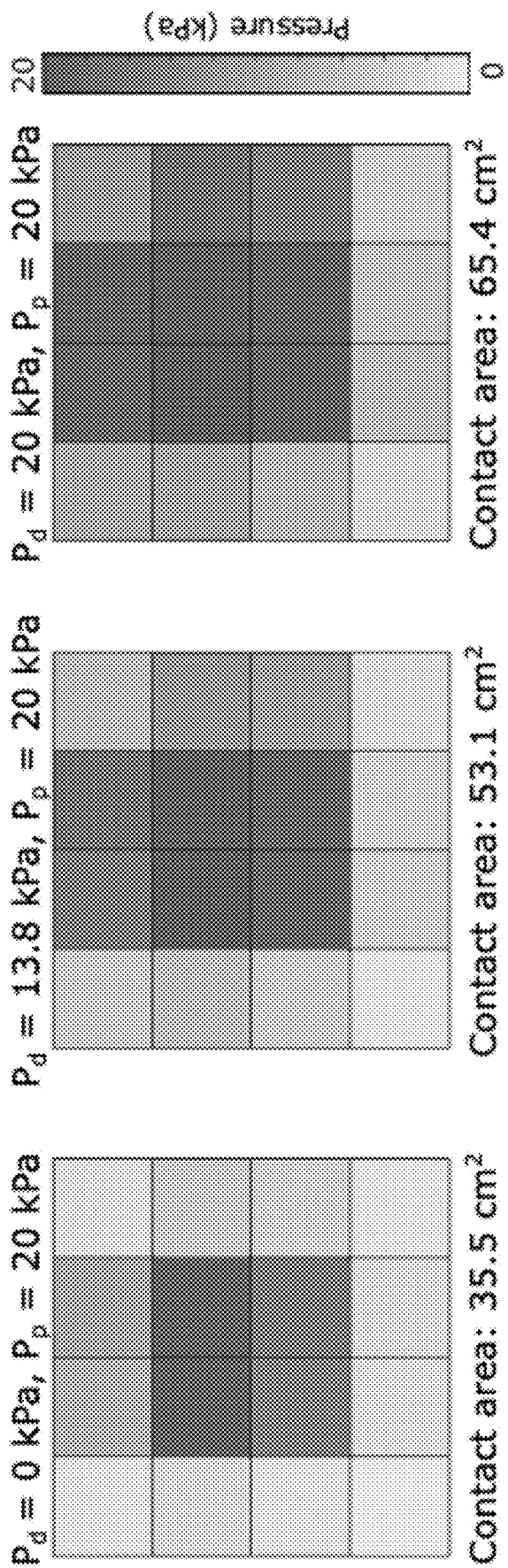

In a stacked pouch setup, only the pressure of the proximal pouch influences the pressure felt at the contact surface. FIG. 4B shows the discretized average pressure recorded by the pressure sensing array when controlling a stacked arrangement with a constant proximal pouch internal pressure Pp=20 kPa and variable distal pouch internal pressure Pd. In all cases, for the center regions where the pouch has complete contact with the force sensing cells, the recorded pressure is 20 kPa. Increasing Pd results in a larger volume filled by the distal pouch. This decreases the effective height of the proximal pouch and thus increases its contact area with the pressure sensing array.

In terms of a force balance, the forces exerted by the proximal and distal pouches must be equal because the stack is constrained between two stationary surfaces. The force each pouch exerts is the product of its contact area and internal pressure. Thus, a lower pressure pouch must have a larger contact area with a surface, and a higher-pressure pouch must have a smaller contact area for the total forces to sum to 0. Therefore, the effective height is the value such that the contact areas produced by the proximal pouch at height heff and the distal pouch at height h—heff at their respective surfaces equal in magnitude. The boundary between the pouches has a complex geometry which is a function of the pouch pressure and the membrane stresses. In the case where either Pd»Pp or vice versa, the higher-pressure pouch fully expands and contacts the opposing surface.

Figure 4C:
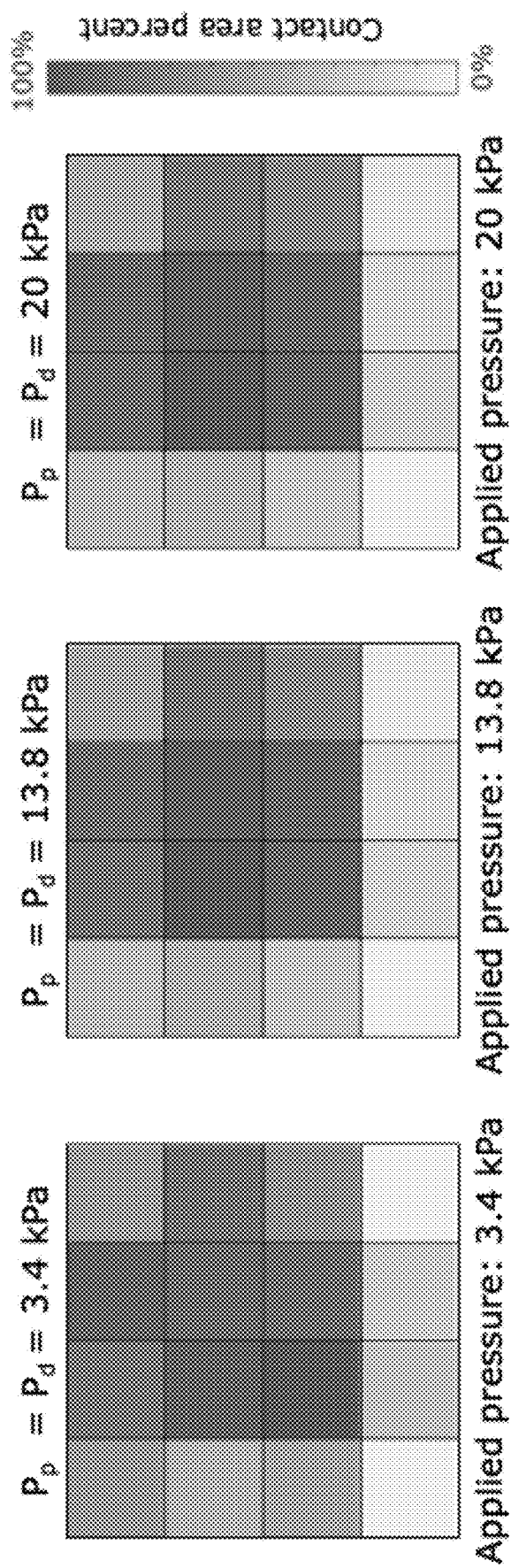

In addition to controlling the contact area while maintaining a constant applied pressure, one can also control the applied pressure while maintaining a constant contact area. FIG. 4C shows how setting Pd=Pp allows us to maintain constant contact area while the applied pressure scales with Pp. Thus, from left to right, the pressure exerted was 3.4 kPa, 13.8 kPa, and 20 kPa. In general, maintaining a constant ratio of Pd:Pp produces a constant contact area.

Therefore, the desired applied pressure determines Pp, and the desired contact area determines heff and Pd.

Dynamic Pressure Response

Dynamic Model

In addition to understanding the static force behavior of the pouches, it is important to understand the dynamic behavior of the pressures, and as a result, the forces. The model would need to be sufficient to describe the trends and predict the behavior as a function of the geometry and input parameters. Such a dynamic model for the pouch pressurization relates the input pressure to the mass of fluid within the pouch and its derivative, mass flow rate. The equations used for exemplary purposes are adapted describe the pressurization of inextensible pouches as a combination of the fluidic resistance generated by the hardware between the pressure source and the pouch, and the fluidic capacitance due to the pouch volume.

Overall, the dynamic model is:

$$P_i = F_{res}(\dot{m}) + F_{cap}(m) \quad (4)$$

where $P_i$ is the input pressure, $F_{res}$ is the fluidic resistance as a function of the mass flow rate, mdot, and $F_{cap}$ is the fluidic capacitance as a function of the fluid mass within the pouch, m. Fluidic resistance for a compressible fluid is:

$$F_{res} = (\dot{m}) = P_i - P_o = C \frac{RT}{P_i A_i^2} \dot{m}^2 \quad (5)$$

where $A_i$ is the cross-sectional area of the tubing, R=8.314 J/(mol.K) is the universal gas constant, T is the gas temperature in kelvins (assumed to be room temperature T=293 K), and C is a fitting constant. This resistance should only depend on the pneumatic hardware, which is kept consistent between tests and designs. The fluidic capacitance, on the other hand, is equivalent to the output pressure within the pouch: $F_{cap}=P_o$. Since the pouch is inextensible, the pouch pressure is a piecewise function, equal to atmospheric pressure until the pouch reaches its maximum volume given the geometric constraints:

$$P_o = \begin{cases} P_{atm} & \text{if } m < \frac{P_{atm} V_{max}}{RT} \\ \frac{mRT}{V_{max}} & \text{if } m \geq \frac{P_{atm} V_{max}}{RT} \end{cases} \quad (6)$$

Where $P_o$ is the pouch pressure, $P_{atm}$ is atmospheric pressure, and $V_{max}$ is the maximum pouch volume given the constraints. For the majority of situations, one would only consider the case where the pouch reaches its full volume. For this reason, the dynamic function is:

$$P_i = C \frac{RT}{P_i A_i^2} \dot{m}^2 + \frac{RT}{V_{max}} m \quad (7)$$

which can be rewritten in terms of the magnitude of the mass flow rate as:

$$|\dot{m}| = \sqrt{\frac{P_i A_i^2}{CRT} \left| P_i - \frac{RT}{V_{max}} m \right|} \quad (8)$$

Since here one only measures pressure within the system, one could rewrite these dynamics in terms of the output pressure, $P_o$:

$$\dot{P}_o = \text{sign}(P_i - P_o) \sqrt{\frac{P_i RT}{V_{max}^2} \frac{A_i^2}{C} |P_i - P_o|} \quad (9)$$

Single Pouch Results

For single pouches, the dynamics were measured after varying pouch size and inflation height. In each test, the pouch was inflated to approximately 10 kPa above atmospheric pressure and the pressure within the pouch was measured over time. Two parameters were extracted from this data: 1) the 10% to 90% rise time and 2) the volume. Since the resistive parameter, $A^2/C$ cannot be separated from the capacitive parameter, $V$, when only the pressure is measured, the inventors also measured the volume and dynamic behavior of unconstrained pouches at each size and used those measurements to fit the fluidic resistance, which should be constant across the tests. For three pouch sizes, the volume of the unconstrained pouches was 598 cm³, 244 cm³, and 72.3 cm³ with rise times of 1.76 s, 0.40 s, and 0.27 s, respectively, leading to a $A^2/C$ value of 0.406.

Figure 5:
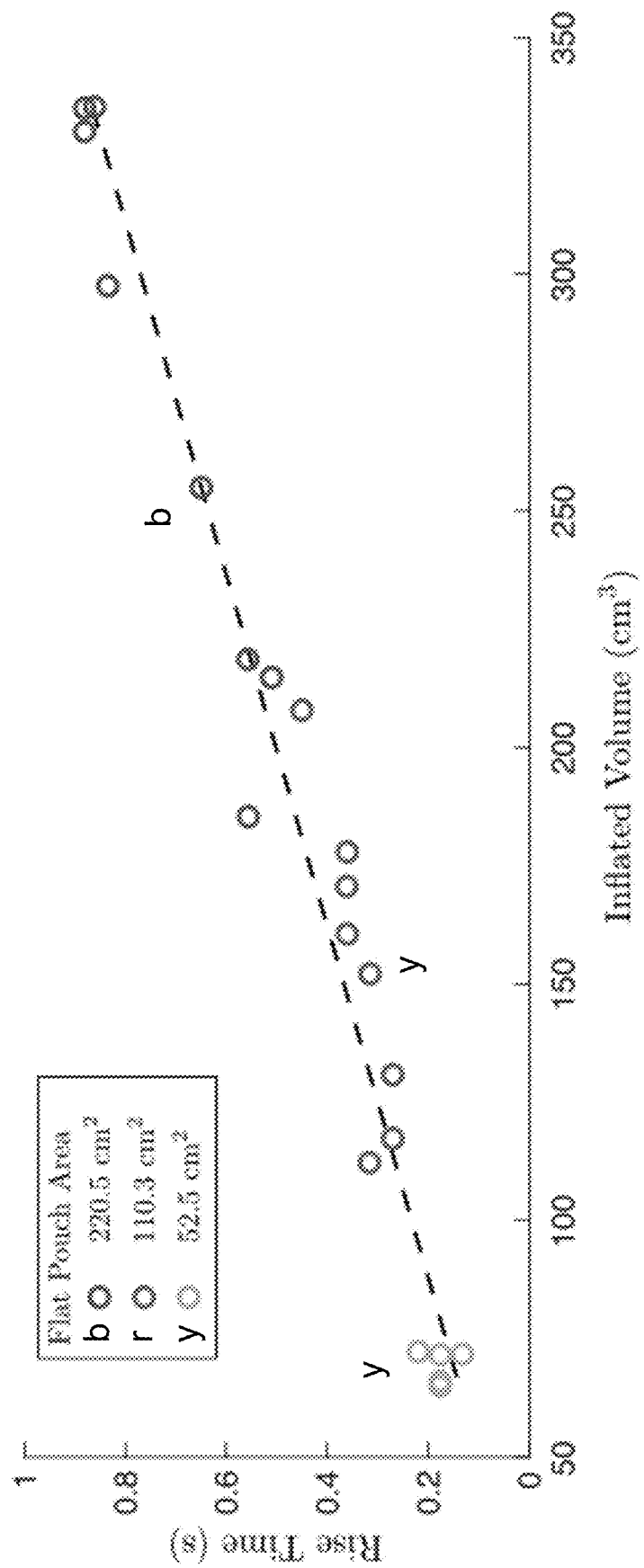
FIG. 5 shows according to an exemplary embodiment of the invention measured rise time as a function of the pouch volume. The pouch volume is found by fitting the dynamic model. Rise time is primarily a function of the pouch size. For color interpretation the reader is referred to Appendix A of the priority document.

FIG. 5 shows the results of the height-constrained single pouch tests. The rise time for a given pressure increases linearly with the increase in volume. While inflation height has an effect on the volume and, as a result, on the rise time, the pouch area has a much larger effect. As shown, for a single pouch, contact area can only be increased by changing the pouch size, so this demonstrates a considerable trade-off between contact area and dynamic response.

Stacked Pouches Results

In the stacked case, the dynamic response depends heavily on how the distal pouch is controlled. Two simple control methods are set mass, where the mass of air within the distal pouch is set before the proximal pouch is pressurized, and set pressure, where the distal pouch pressure is controlled. One would only consider the set pressure control method to examine changes in the dynamics. For this, closed-loop pressure control was accomplished using a pressure regulator.

Figure 6:
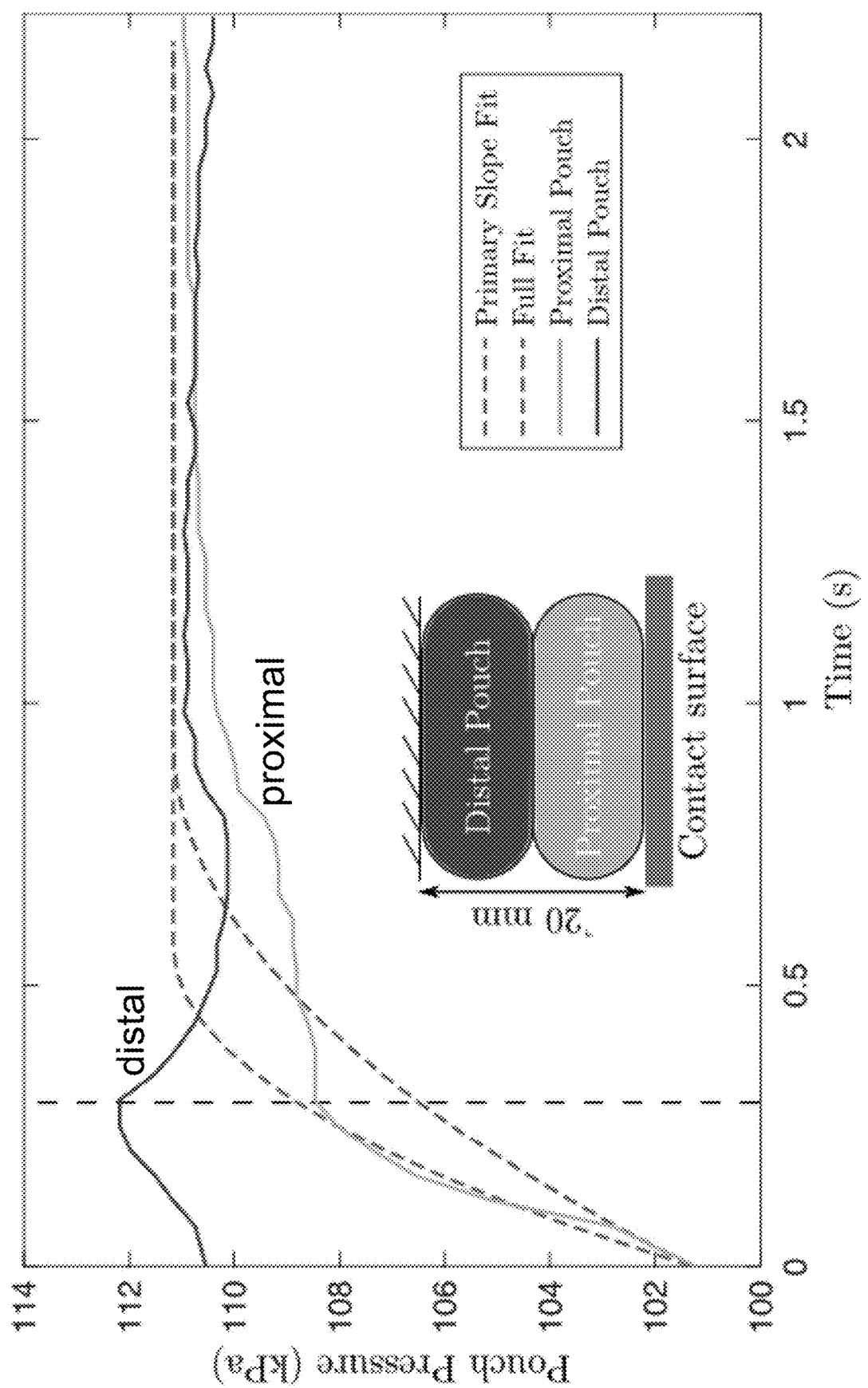
FIG. 6 shows according to an exemplary embodiment of the invention behavior of a stacked pouch system with medium pouches inflated to h=20 mm. The distal pouch is controlled to a set pressure and the proximal pouch is given a step input to 10.0 kPa. The dynamic model is fit for the full data set (V=290 cm$^3$, $t_{rise}$=1.1 s) and for just the initial slope (V=177 cm$^3$, $t_{rise}$=0.39 s). For color interpretation the reader is referred to Appendix A of the priority document.

Same-sized and differently-sized stacked pouches were considered. In general, stacking pouches leads to initial rise times that are faster than or equal to single pouches with the same height. In the case of two equal-sized pouches with a flat area of 110.3 cm² (FIG. 6), the initial rise of the proximal pouch pressure leads to a fit with a volume and estimated rise time that are on the lower end of the medium sized pouch grouping in FIG. 5. However, the full rise is much slower after the distal pouch control responds, leading to an undershoot in the distal pouch pressure. This again indicates that stacked dynamics are highly dependent on the control of both pouches. Even in this case though, the change in contact area due to the distal pouch pressure means that the force rise is much faster and the final force is higher.

Application

The inventors created a pneumatic haptic display with adjustable contact area and the fast rise times characteristic of smaller volume pouches. The stacked pouch array was designed to match data collected during interaction with a teleoperated bimanual robot with two torque-controlled Franka Emika 7-DOF arms and a soft, padded exterior instrumented with 61 force sensors across its chest, back, and arms.

Due to the robot's teleoperated nature and physical human-robot interaction intrinsic to hugging, a large distributed pressure haptic display could provide useful feedback for a user. Pneumatic actuation is particularly well suited for human-human contact due to the frequency range of volitional human motion being ≤10 Hz [21]. FIG. 7A shows a stacked pouch array having one large distal pouch (10.5 cm×21 cm) and four smaller proximal pouches (5.25 cm×10 cm), which could form one unit of a larger haptic display. By inflating the large distal pouch, the contact area of the smaller pouches for a given height is greater than if they were arranged in parallel by themselves. Controlling each of these smaller pouches individually produces unique pressure patterns (FIG. 7B).

The inventors used this stacked pouch array to match pressure profiles from the huggable robot dataset. An Arduino Mega microcontroller commanded recorded pressure profiles to QB3 pressure regulators (Proportion Air). For storage efficiency, these profiles were decomposed into a piecewise function of high order polynomials. FIG. 7C shows the total force produced by the stacked pouch setup replicating one such pressure pattern. The same pressure pattern was used as the input for both stacked and non-stacked systems. Stacked pouches yielded a larger total force compared to the non-stacked case due to larger contact area; this difference in total force may elicit different user responses. Moreover, the pouch contact area can be controlled between that of the stacked and non-stacked cases, so this pressure profile can be used to create force profiles between the two extremes in FIG. 7C.

What is claimed is:

1. A method of independently controlling force and contact area of an actuator for a haptic display to elicit a touch sensation, comprising:
    (a) having a first layer, wherein the first layer comprises of one or more distal pouches, wherein each of the distal pouches has a flexible surface and a volume with a pressure;
    (b) having a second layer, wherein the second layer comprises of one or more proximal pouches, wherein each of the proximal pouches has a flexible surface and a volume with a pressure, wherein the second layer is stacked on top of the first layer as two separate independent layers that do not cross each other in a plane, and wherein the second layer is either directly or indirectly in contact with an object or a person;

(c) controlling the pressure of the volume of the one or more distal pouches in the first layer; and (d) controlling the pressure of the volume of the one or more proximal pouches in the second layer, wherein the pressure control in the first layer is independent from the pressure control in the second layer resulting in an independent control of an amount of force and a contact area at the surface of the second layer, which is either directly or indirectly in contact with the object or the person.

2. The method as set forth in claim 1, wherein the second layer has two or more proximal pouches.

3. The method as set forth in claim 1, wherein the number of proximal pouches in the second layer is larger than the number of distal pouches in the first layer.

4. The method as set forth in claim 1, wherein the proximal pouches are smaller or equal in volume compared to the distal pouches.

5. The method as set forth in claim 1, wherein the number of distal pouches in the first layer is two or more and wherein the pressure for each of the distal pouches is independently controlled from each other.

6. The method as set forth in claim 1, wherein the number of proximal pouches in the second layer is two or more and wherein the pressure for each of the proximal pouches is independently controlled from each other.

7. The method as set forth in claim 1, wherein the pressure in the distal and proximal pouches is controlled pneumatically or hydraulically.

\* \* \* \* \*